(12) United States Patent
Hu et al.

(10) Patent No.: US 9,984,118 B2
(45) Date of Patent: May 29, 2018

(54) DATA LOADING TECHNIQUES FOR AN IN-MEMORY DATABASE

(71) Applicants: Leo Hu, Shanghai (CN); Yuan Fang, Shanghai (CN); Yun Jin, Shanghai (CN); Wen-Syan Li, Fremont, CA (US)

(72) Inventors: Leo Hu, Shanghai (CN); Yuan Fang, Shanghai (CN); Yun Jin, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 392 days.

(21) Appl. No.: 14/328,508

(22) Filed: Jul. 10, 2014

(65) Prior Publication Data
US 2016/0012108 A1    Jan. 14, 2016

(51) Int. Cl.
*G06F 17/30* (2006.01)

(52) U.S. Cl.
CPC .... *G06F 17/30445* (2013.01); *G06F 17/3048* (2013.01); *G06F 17/30442* (2013.01)

(58) Field of Classification Search
CPC .............. G06F 17/3048; G06F 17/30442
See application file for complete search history.

(56) References Cited

U.S. PATENT DOCUMENTS

| | | | |
|---|---|---|---|
| 2010/0036890 A1* | 2/2010 | Kawamura | G06F 11/1458 707/654 |
| 2013/0267312 A1* | 10/2013 | Walsh | G07F 17/3225 463/31 |
| 2014/0280373 A1* | 9/2014 | Raitto | G06F 17/30292 707/803 |
| 2015/0112998 A1* | 4/2015 | Shankar | G06F 17/30312 707/741 |

OTHER PUBLICATIONS

"Getting Started with In-Memory Databases in Adaptive Server® Enterprise 15.5" Sybase, retrieved from http://www.sybase.de/files/White_Papers/ASE-IMDB-Getting-Started-WP.pdf, 2009, 12 pages.

Prasanna Venkatesh and BVP Vamsi, "The Importance of In-memory Databases", retrieved from http://www.opensourceforu.com/2012/01/importance-of-in-memory-databases/, Jan. 30, 2012, 6 pages.

Steve Graves, "101: An Introduction to In-Memory-Database-Systems" retrieved from http://intelligenttradingtechnology.com/article/101-introduction-memory-database-systems, Jan. 5, 2012, 6 pages.

* cited by examiner

*Primary Examiner* — Grace Park
(74) *Attorney, Agent, or Firm* — Brake Hughes Bellermann LLP

(57) ABSTRACT

A query analyzer may be used to identify a plurality of queries and associated query characteristics, the query characteristics including a corresponding dataset of data units for each query, wherein the data units are to be loaded from an offline memory into a memory of an in-memory database. Then, a sequencer may be used to select a selected dataset for loading into the memory of the in-memory database, based on dependencies between the plurality of queries as included within the query characteristics, and on relationships, if any, between the datasets.

20 Claims, 4 Drawing Sheets

DATA LOADING TECHNIQUES FOR AN IN-MEMORY DATABASE

TECHNICAL FIELD

This description relates to data loading for in-memory databases.

BACKGROUND

An in-memory database, also known as a main memory database, or memory resident database, refers generally to a database management system that relies on a main memory of an associated computing device for storing data to be queried or otherwise processed. The use of an in-memory database is known to provide high speed processing for large quantities of data.

In practice, data to be processed may initially be stored in a long-term, non-volatile memory, such as a disk-based storage medium. Then, some or all of the data may be loaded from the disk-based storage into the main memory of the in-memory database, for processing.

Thus, during an initial operation of an in-memory database with respect to a particular set of queries and/or data, it is necessary to load the data to be processed into the main memory. Moreover, by nature, the main memory of an in-memory database is volatile and may be subject to unpredictable hardware or software difficulties that may lead to a loss of data within the main memory. In such cases, ongoing queries being processed may be interrupted, and scheduled queries may not yet have begun. In such cases, data must be re-loaded from the offline, non-volatile memory, into the main memory of the in-memory database.

SUMMARY

According to one general aspect, a system may include at least one processor, and instructions recorded on a non-transitory computer-readable medium, and executable by the at least one processor. The system may include a query analyzer configured to cause the at least one processor to identify a plurality of queries and associated query characteristics, the query characteristics including a corresponding dataset of data units for each query, wherein the data units are to be loaded from an offline memory into a memory of an in-memory database. The system may further include a sequencer configured to cause the at least one processor to select a selected dataset for loading into the memory of the in-memory database, based on dependencies between the plurality of queries as included within the query characteristics, and on relationships, if any, between the datasets.

According to another general aspect, a computer-implemented method for executing instructions stored on a non-transitory computer readable storage medium may include identifying a plurality of queries and associated query characteristics, the query characteristics including a corresponding dataset of data units for each query, wherein the data units are to be loaded from an offline memory into a memory of an in-memory database, and identifying at least two candidate datasets, each candidate dataset and associated query not depending on any query, and not having any overlapping data units with any other candidate dataset. The method may further include selecting a selected dataset from the at least two candidate datasets, based on an importance value of each data unit within each candidate dataset, loading the selected dataset into the memory of the in-memory database; and iteratively repeating the identifying of at least two candidate datasets, based on updated query characteristics, the selecting of a new selected dataset, and the loading of the new selected dataset, until all of the data units of the datasets have been loaded into the memory of the in-memory database.

According to another general aspect, a computer program product may be tangibly embodied on a non-transitory computer-readable storage medium and may comprise instructions that, when executed, are configured to cause at least one processor to identify a dependency graph including nodes representing a corresponding plurality of queries and associated query characteristics, the query characteristics including a corresponding dataset of data units for each query, wherein the data units are to be loaded from an offline memory into a memory of an in-memory database. The instructions, when executed, may be further configured to cause the at least one processor to select a selected dataset, based on dependencies between the plurality of queries as included within the dependency graph, and on relationships, if any, between the datasets, load the selected dataset into the memory of the in-memory database, and select a new selected dataset, based on the dependency graph and on updated query characteristics following the selection of the selected dataset.

The details of one or more implementations are set forth in the accompanying drawings and the description below. Other features will be apparent from the description and drawings, and from the claims.

DETAILED DESCRIPTION

Figure 1:
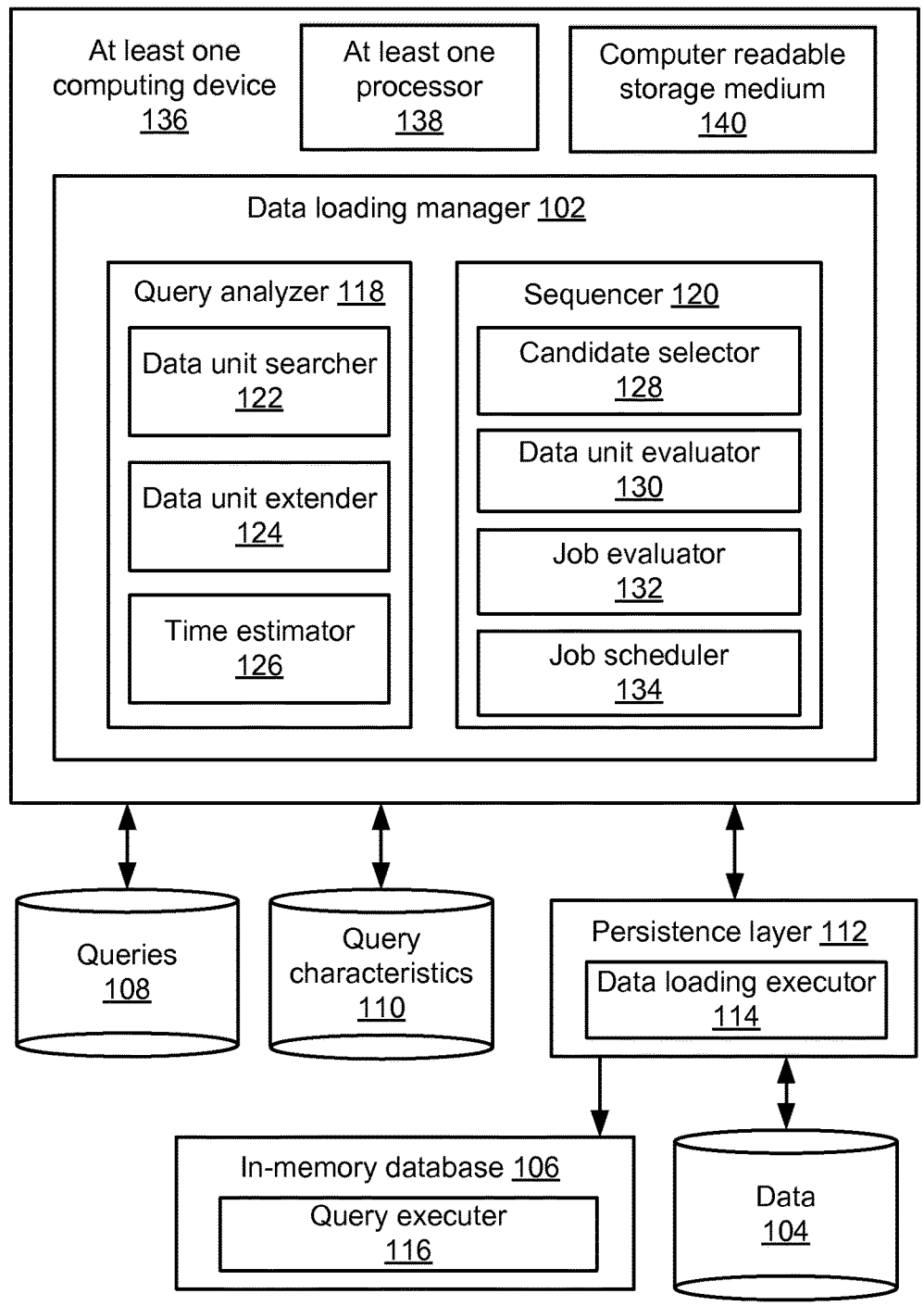
FIG. 1 is a block diagram of a system for loading data into an in-memory database.

FIG. 1 is a block diagram of a system 100 for using a data loading manager 102 to load data 104 into an in-memory database 106. More specifically, as described in detail below, the data loading manager 102 may be configured to load data units of the data 104 into the in-memory database 106 in an intelligent, optimized manner, so as to fully realize the benefits of the data processing speeds offered by the in-memory database 106.

For example, as referenced above, the in-memory database 106 may represent or include any appropriate main memory and associated database management system that is designed to load the data 104, e.g., from a disk-based or other offline storage medium, for processing thereof. In so doing, the in-memory database 106 provides extremely fast and predictable processing of large quantities of data.

However, and particularly given that the quantities of data to be processed may be large, an effective processing speed of the in-memory database 106 may be significantly reduced, depending on a specific nature of the processing, including queries 108 to be applied against the data 104, as well as on associated query characteristics 110. In particular, as described in detail herein, an order or sequence in which individual data units of the data 104 are loaded into the in-memory database 106 may significantly reduce an effective processing speed of the in-memory database 106 with respect to the queries 108, depending on the query characteristics 110 and on relationships, if any, between datasets of the data 104 to be processed by the queries 108.

In other words, the system 100 of FIG. 1 illustrates a situation in which the data 104 is in the process of being loaded into the in-memory database 106, for processing thereof by the queries 108, such as may occur in the scenarios referenced above (e.g., in the case of a cold start, quick recovery, initial loading, or in the case of a system crash or other disruption). By way of contrasting example, in scenarios in which an entirety of the data 104 has already been loaded into the in-memory database 106, then the in-memory database 106 will have fast and full access to any individual data unit, or individual datasets of groups of data units, contained within the data 104, so that query results may be provided by the in-memory database 106 at a maximum speed corresponding to a maximum processing speed of the in-memory database 106.

However, during scenarios in which loading of the data 104 is an active, ongoing process, a number of situations can occur in which the effective processing speed of the in-memory database 106 is reduced from the above-referenced maximum processing speed. Moreover, even in scenarios in which a processing speed of the in-memory database 106 remains high, it may occur that relatively low priority queries of the queries 108 are executed prior to relatively high priority queries.

In order to avoid these and related scenarios, the data loading manager 102 is configured to instruct a persistence layer 112 to utilize a data loading executor 114 thereof to load specified datasets of individual data units of the data 104 into a query executor 116 of the in-memory database 106, in a manner which enables fast and efficient processing of the queries 108, including an appropriate prioritization of the queries 108 with respect to one another. In order to provide these and related features and advantages, the data loading manager 102 relies upon various known and/or derived characteristics of the queries 108, referred to above and illustrated in the example of FIG. 1 as the query characteristics 110. Detailed examples of the query characteristics 110 are provided below, but, in general, the query characteristics 110 may be understood to include, for example, a relative importance of an individual query, an estimated execution time of an individual query, data accessed by each query, an estimated loading time for the accessed data, dependencies between and among the queries 108, and relationships among accessed datasets.

In particular, as just referenced, two or more of the queries 108 may be dependent on one another. By way of a specific, non-limiting example, a first query may be related to an analysis of customer data, while a second query may be related to a prediction of customer behavior, based on the preceding analysis. In such cases, the prediction-related query is dependent upon the analysis-related query. More generally, many scenarios may be imagined in which an output of a query is relied upon as input for a subsequent, dependent query, and/or data required for execution of a query is part of a larger dataset required for execution of a subsequent query. Consequently, as illustrated and described below with respect to the example of FIG. 2A, a dependency graph for individual queries of the queries 108 may be constructed, e.g., as the directed acyclic graph 200A of FIG. 2A.

On the other hand, it is not necessarily the case that queries of the queries 108 are dependent upon one another.

For example, as illustrated and described below with respect to the simplified example of FIG. 2B, a plurality of independent queries may be represented by the graph 200B. In other words, as described below, the graph 200B assumes that the input of a given query is not reliant upon an output of a preceding query. Nonetheless, it may occur that datasets accessed by the various queries may be related to one another, even in the case of entirely independent queries as illustrated with respect to FIG. 2B. For example, a given query may require a certain dataset, while a second, independent query may utilize some portion of that dataset. In such cases, as described in detail below, it would be preferable to load the portion or subset of data for processing by the second query, before loading the remainder of the relevant dataset for processing thereof by the first query.

Therefore, in order to provide efficient and optimized loading of the data 104 into the in-memory database 106 for processing of the queries 108, the data loading manager 102 includes a query analyzer 118 and a sequencer 120. More specifically, the query analyzer 118 may be configured to receive known, available input characteristics of the query characteristics 110, and may be further configured to derive additional characteristics of the query characteristics 110, based thereon. In specific examples, as described in detail below, the query analyzer 118 may provide data structures which represent or include the query characteristics 110.

Then, the sequencer 120 may proceed to utilize the data structures provided by the query analyzer 118 with respect to the query characteristics 110 and the queries 108, to thereby select a currently-optimal dataset of the data 104 for loading into the in-memory database 106. Thereafter, the query analyzer 118 and the sequencer 120 may execute in an iterative manner, to thereby update the data structures provided by the query analyzer 118, and to use the updated data structures to determine a new, optimal dataset to be loaded from the data 104 into the in-memory database 106. Such iterations may continue until all relevant datasets of the data 104 have been loaded into the in-memory database 106.

In more detail, and by way of terminology, the data 104 should be understood to include individual data units that may be processed by the queries 108. For example, such an individual data unit may represent or include an individual column of a table stored within the data 104. Then, a query of the queries 108 may be designed to process a single such data unit, or a plurality or set of such data units, which may be referred to herein as a dataset, or data list. Thus, as referenced above, a specific query may be configured to execute against a defined dataset of data units, while another query may be configured to execute against the same, overlapping, or different set of data units.

Meanwhile, with respect to the query characteristics 110, it is assumed for the sake of the example of FIG. 1 that some such query characteristics are known as inputs to the query analyzer 118, while other query characteristics are derived by the query analyzer 118. For example, it is assumed that dependencies between the queries 108, such as represented by the dependency graphs 200A and/or 200B of FIGS. 2A and 2B, respectively, are known inputs, included within the query characteristics 110 during a design time of the system 100. Further, a relative importance, priority, or ranking of queries of the queries 108 may be included within the query characteristics 110 during a design time of the system 100 of FIG. 1. For example, a relative importance value for each query of the queries 108 may be entered by an administrator or other user of the system 100. Of course, such examples are considered to be illustrative and non-limiting, so that, for example, query dependencies and/or relative importance rankings may be algorithmically or otherwise derived from the queries 108 in alternative implementations of the system 100 of FIG. 1.

Meanwhile, the query analyzer 118 may be configured to derive additional characteristics to be included within the query characteristics 110. For example, as shown, the query analyzer 118 may include a data unit searcher 122, which may be configured to analyze an individual query and determine data units processed thereby. Moreover, assuming at least a potential for query dependencies, such as illustrated in the example of FIG. 2A, the query analyzer 118 may further include a data unit extender 124 that is configured to identify data units accessed by queries upon which a given, currently-analyzed query depends.

Figure 2A:
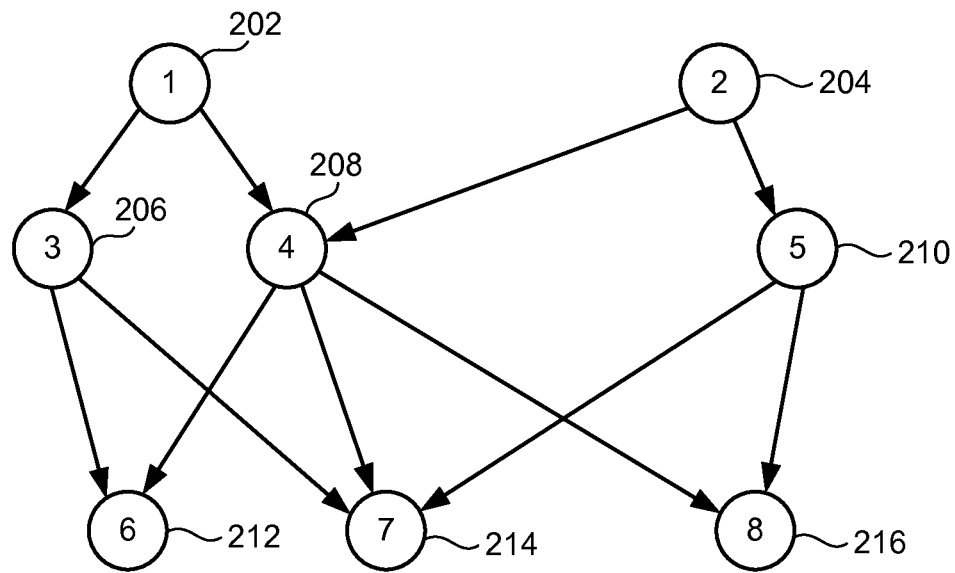
FIG. 2A is a first example of a dependency graph for queries to be executed using an in-memory database.

For example, with reference to the specific example of FIG. 2A, the directed, acyclic graph 200A illustrates nodes 202-216, connected by the various dependencies illustrated therein. In the example of FIG. 2A, as described in detailed use case examples provided below, it may occur that the node 202 corresponds to a first query designed to process a dataset that includes data units referred to herein as C1, C2 (e.g., representing a first column and second column of a data table), while the node 206 represents a third query, configured to process a data unit referred to as C5. Then, the data unit searcher 122 should be understood to analyze the node 206 and identify its corresponding dataset consisting of the single data unit C5, while the data unit extender 124 should be understood to consider dependencies of the node 206 and extend the dataset required by the node 206 to include the data units C1, C2 of the node 202.

In other words, in an example of processing a third query 206 of a set of queries in graph 200A, the data unit searcher 122 may initially determine a direct inclusion of an identified data unit C5, while the data unit extender 124 may utilize the dependency graph 200A to determine a reliance on data units C1, C2. Put another way, the data unit extender 124 recognizes that a dataset of data units required by a given query, such as the third query corresponding to the node 206 of the graph 200A, may require a dataset of data units C1, C2 of parent node 202.

Figure 2B:
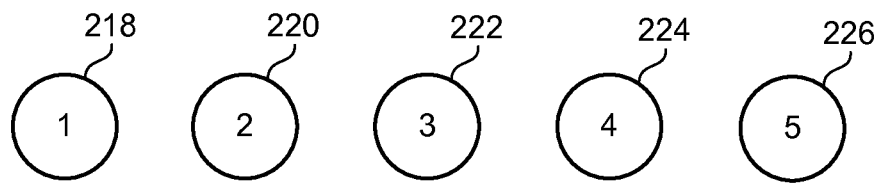
FIG. 2B is a second example of a dependency graph for queries to be executed using an in-memory database.

In scenarios in which direct dependencies between queries do not exist, such as in the graph 200B of FIG. 2B, nodes 218-226 represent queries of the queries 108 that do not directly depend on one another in the sense that an output of one query is not required as input for a second query. Nonetheless, as referenced above, it may occur that datasets of data units accessed by two or more of the queries represented by the nodes 218-226 are related in some way. For example, the query represented by the node 218 may access a dataset that includes a first data unit and second data unit, while the query represented by the node 220 may access a dataset that includes only the first data unit. More generally, it may occur that a given data unit, or group of data units, may frequently be accessed by multiple ones of the nodes 218-226, so that such a data unit should be understood to be potentially highly prioritized for loading into the in-memory database 106. Of course, such relationships between accessed datasets may occur in the context of dependent queries of FIG. 2A, as well.

Finally in the example of the query analyzer 118 of FIG. 1, a time estimator 126 is included. In particular, the time estimator 126 may be configured to estimate an execution time of a given query of the queries 108. Additionally, or alternatively, the time estimator 126 may be configured to estimate a loading time with respect to a given data unit or dataset of the data 104. Example parameters for such time estimations are provided below by way of example, but, in general, it should be appreciated that various known or future techniques may be utilized to execute such time estimations.

Thus, the query analyzer 118 provides all necessary data regarding the query characteristics 110, including known and derived characteristics of the queries 108 and datasets to be accessed thereby, to the sequencer 120. In particular, in using the terminology of the use case example provided below, the query analyzer 118 may provide such information regarding the query characteristics 110 in the form of a data structure referred to herein as an sNode data structure. In the context of the sNode data structure, the various query nodes of the queries 108, such as the nodes 202-216 of FIG. 2A, or nodes 218-226 of FIG. 2B, may be understood to correspond to specific queries represented in the standard query language (SQL), so that each node corresponds to an SQL statement or SQL string. Then, the sNode data structure in its entirety may include each such query/SQL string, as well as, for example, a dataset of data units of each SQL string, a relative importance ranking of each SQL string, an estimated execution time of each SQL string, and an estimated loading time for each dataset of data units of each SQL string. In such examples, the sNode data structure implicitly includes the dependencies between the various nodes, by including datasets for each node that include or contain parent datasets of parent nodes.

In this regard, it may be appreciated that the following examples primarily discuss the queries 108 in the context of SQL strings. Nonetheless, it may be appreciated from the above discussion that the queries 108 should be understood to represent virtually any type or format of query that may be executed within the query executor 116 of the in-memory database 106. Even more generally, the term query in the context of FIG. 1 should be understood to represent virtually any operation or processing that may be executed with respect to the data 104 within the in-memory database 106.

Upon receipt of the known and derived query characteristics 110, e.g., in the form of the sNode data structure as just described, the sequencer 120 may proceed to select a current, optimal dataset for loading into the in-memory database 106. In particular, as shown, the sequencer 120 may include a candidate selector 128 that is configured to select one or more of the sNodes of the sNode data structure, thereby selecting corresponding datasets as potential candidate datasets for current loading from the data 104.

In operation, the candidate selector 128 selects sNodes of the sNode data structure which correspond to independent nodes of the corresponding dependency graph, where the candidate selector 128 also determines that no such independent node includes a dataset that is contained within another independent node of the corresponding dependency graph. For example, with respect to FIG. 2A, the only possible candidate nodes and associated candidate datasets would be the nodes 202, 204, because the nodes 202, 204, as shown, do not have a dependency on any earlier node. Therefore, if a dataset of the node 202 is not contained within a dataset of the node 204 (or vice versa), then the nodes 202, 204 may be determined to be candidate nodes for loading of an associated candidate dataset as the current, optimal dataset to be loaded. Meanwhile, with respect to the example of FIG. 2B, all of the illustrated nodes 218-226 are independent of one another. Therefore, any one or more such nodes having a corresponding query with a dataset that is not contained within any dataset of the remaining nodes may be selected as potentially providing a current, optimal dataset to be loaded by the candidate selector 128.

Thus, and by way of terminology with respect to the use case examples provided below, the candidate selector 128 may be understood to effectively select a subset of nodes of the sNodes identified within the sNode data structure received from the query analyzer 118. Specifically, as described, the identified subset of sNodes represent candidate nodes and associated datasets, one of which may be determined to be the current optimal dataset to be loaded as part of a current data loading job, depending on subsequent analysis as described herein. Therefore, the identified subset of nodes provided by the candidate selector 128 may be referred to herein as jNodes, or job nodes.

Then, in order to thereafter select from among the datasets identified by the candidate selector 128, a data unit evaluator 130 may proceed to fully instantiate a data structure representing individual data units, referred to herein as a dNode(s), or data unit node(s). For example, a data unit evaluator 130 may determine characteristics of data units of each data set of the candidate data sets provided by the candidate selector 128. In particular, as in the examples below, the data unit evaluator 130 may determine various characteristics of the data units, such as, for example, a size of each data unit, an importance of each data unit, and a frequency with which each data unit is required by the various sNodes representing the queries 108.

In this regard, it should be appreciated that such data unit characteristics may be understood to be included, directly or indirectly, within the query characteristics 110, inasmuch as the data units themselves are referenced within the query characteristics 110 as being associated with individual, corresponding queries. Thus, similarly to the query characteristics 110, an importance value for a given data unit may be at least partially obtained from an administrator or other user of the system 100, and/or may be derived in whole or in part from external data, using appropriate algorithmic techniques. On the other hand, other data unit characteristics may be derived, e.g., from the sNode provided by the query analyzer 118. For example, in the latter case, a data unit characteristic may include a listing of all queries which access the data unit, where such a query listing may be obtained through analysis of the sNode provided by the query analyzer 118.

Then, a job evaluator 132 of the sequencer 120 may evaluate the candidate datasets provided by the candidate selector 128, based on results of the evaluations of the data unit evaluator 130, and on the query characteristics 110 in general. Accordingly, the job evaluator 132 may select a particular jNode, i.e., may select a particular dataset associated therewith, for scheduling thereof by a job scheduler 134 for loading into the in-memory database 106. Specifically, as shown, the job scheduler 134 may be configured to communicate with the persistence layer 112 and instruct the data loading executor 114 thereof to load the identified dataset of the data loading job into the query executor 116 of the in-memory database 106.

Thus, the data loading manager 102 is operable to identify a specific data loading job, taking into account relative priorities of queries and associated data units, associated execution and loading times, dependencies between queries, and relationships among accessed datasets. Once the data loading job has been scheduled and loaded in this manner, the query analyzer 118 and the sequencer 120 may proceed iteratively to select a new, current optimal data loading job, in the same manner as just described, until all data loading jobs for a corresponding dataset have been completed.

In the example of FIG. 1, the data loading manager 102 is illustrated as being executed using at least one computing device 136, which itself includes at least one processor 138, and non-transitory computer readable storage medium 140. In other words, the at least one computing device 136 should be understood to represent a single computing device, or two or more computing devices in communication with one another. Similarly, the at least one processor 138 may be understood to represent, for example, two or more processors executing in parallel, while the non-transitory computer readable storage medium 140 should be understood to represent virtually any suitable storage medium that may be used to store instructions which, when executed by the at least one processor 138, provided features and functions of the data loading manager 102 as described herein.

Although the at least one computing device 136 is illustrated as being separate from the in-memory database 106, the persistence layer 112, the data 104, the queries 108, and the query characteristics 110, it may be appreciated that, in various implementations, the at least one computing device 136 may include one or more of these components. For example, the at least one computing device 136 may share hardware and software with the in-memory database 106.

Further, in FIG. 1, the data loading manager 102 is illustrated as including various components illustrated as separate, discrete components 118-134. However, in various implementations, it will be appreciated that any two or more such components may be combined for execution as a single component, while, in additional or alternative implementations, any single component may be executed as two or more subcomponents.

Figure 3:
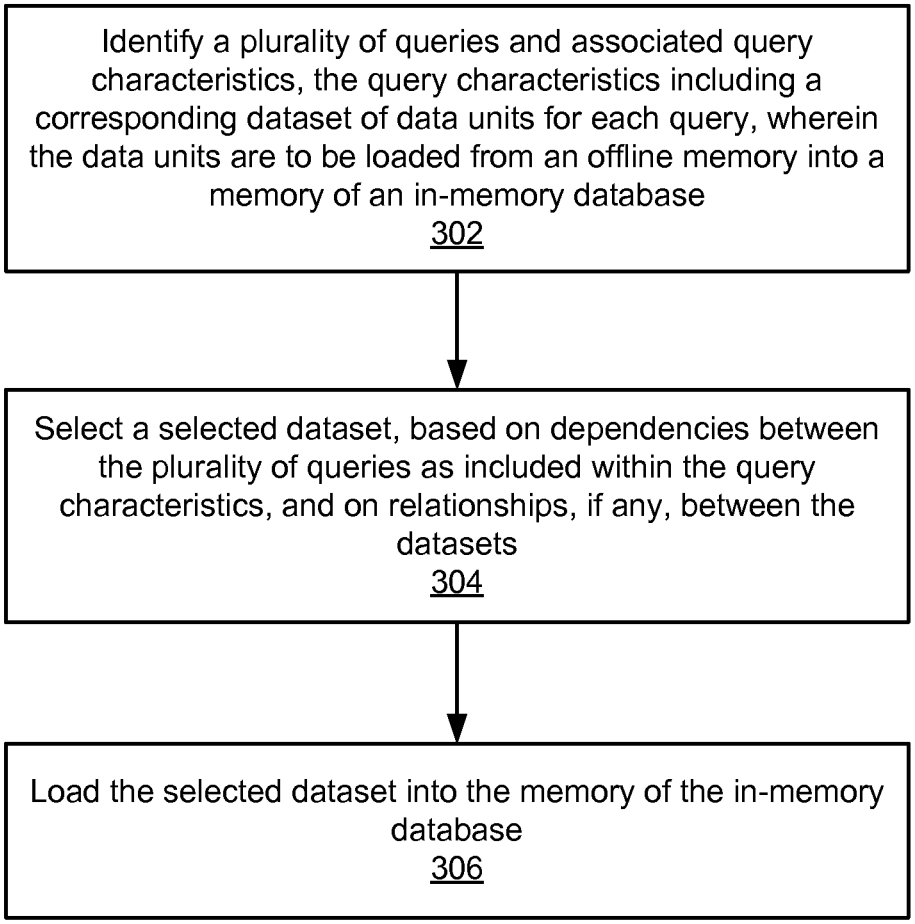
FIG. 3 is a flowchart illustrating example operations of the system of FIG. 1.

FIG. 3 is a flowchart 300 illustrating example operations of the system 100 of FIG. 1. In the example of FIG. 3, operations 302, 304, 306 are illustrated as separate, sequential operations. However, it may be appreciated that, in alternative implementations, additional or alternative operations or sub-operations may be included, and/or one or more operations may be omitted. In such various implementations, the various operations may be executed in a partially or completely overlapping or parallel manner, or in a nested, iterative, looped, or branched fashion.

In the example of FIG. 3, a plurality of queries and associated query characteristics may be identified, the query characteristics including a corresponding dataset of data units for each query, wherein the data units are to be loaded from an offline memory into a memory of an in-memory database (302). For example, the query analyzer 118 may be configured to identify the queries 108 and the query characteristics 110, where, as described, each query of the queries 108 is associated with one or more corresponding query characteristics of the query characteristics 110, and each query of the queries 108 is associated with a dataset including one or more data units of the data 104. Further, as also described, the datasets of the queries 108 are to be loaded from the offline memory of the data 104, e.g., disk storage, into the in-memory database 106.

A selected dataset may be selected, based on dependencies between the plurality of queries as included within the query characteristics, and on relationships, if any, between the datasets (304). For example, the sequencer 120, e.g., the candidate selector 128, may be configured to select a selected dataset from among independent queries having corresponding datasets that do not contain any other dataset of any of the other independent queries. Of course, as described herein, various other ones of the query characteristics may be used as part of the selection process, such as, for example, a relative importance of a given query, a relative importance of a given data unit of a dataset, an estimated query execution time, an estimated data loading time, or any other appropriate query characteristic.

The selected dataset may then be loaded into the memory of the in-memory database (306). For example, the sequencer 120 may instruct the persistence layer 112 to cause the data loading executor 114 to load the selected dataset from the data 104 into the main memory of the in-memory database 106. Then, as described herein, although not specifically illustrated in the simplified example of FIG. 3, the process may continue iteratively, e.g., with a second, subsequent selection of a current selected dataset for loading from the data 104 into the main memory of the in-memory database 106, or such iteration may continue until all relevant datasets of the data 104 have been loaded into the in-memory database 106 for processing by the queries 108.

Figure 4:
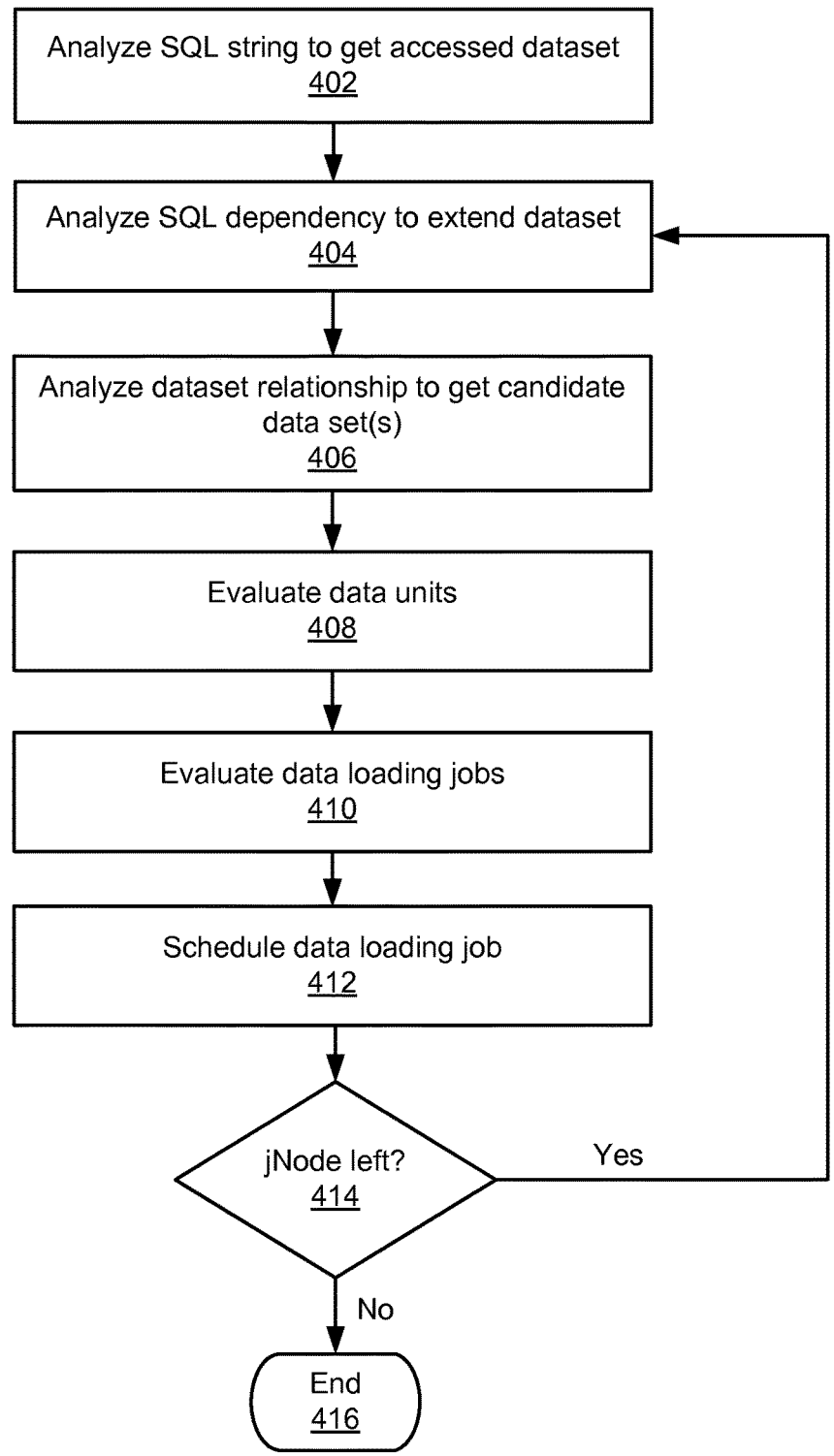
FIG. 4 is a flowchart illustrating more detailed example operations of the system of FIG. 1.

FIG. 4 is a more detailed example flowchart 400 illustrating operations of the system 100 of FIG. 1. With respect to the example of FIG. 4, the above-referenced data structures of sNode, dNode, and jNode, are described in more detail, to thereby provide a basis for detailed example algorithms and formulae implemented by the data loading manager 102, as well as associated use case examples.

As described above, the sNode data structure is designed for each SQL statement, while the dNode data structure is designed for each data unit (e.g., for each column of an in-memory column-based database), while jNode is designed to represent each potential data loading job. Therefore, the sNode data structure may be represented using equation 1:

$$sNode=(id,dL,imp,t_e,t_l) \qquad \text{Equation 1}$$

In Equation 1, "id" refers to a unique identifier of a corresponding SQL statement, while "dL" represents a dataset or data list of data units accessed by the corresponding SQL statement or string. Further, "imp" represents a relative importance value assigned to the SQL in question, "$t_e$" represents the estimated execution time of the corresponding SQL statement, and "$t_l$" represents a consumed time required for loading a corresponding dataset dL. As referenced above, the execution time $t_e$ may be estimated, for example, by analyzing a time complexity of the corresponding SQL statement. Meanwhile, $t_l$, the estimated loading time, may be calculated by the size of the datasets to be loaded in conjunction with a data loading rate of a data channel connecting the persistence layer 112 with the in-memory database 106.

As also described above with respect to the data unit searcher 122 and the data unit extender 124, the dataset $d_L$ may be extended to include not only the dataset directly accessed by the corresponding SQL statement, but also the data units accessed by SQL statements/nodes on which the current, corresponding SQL statement depends.

The dNode data structure may be represented by Equation 2:

$$dNode=(id,sL,size,w) \qquad \text{Equation 2}$$

In Equation 2, "id" is a unique identifier of the corresponding data unit, while "sL" represents a list of all SQL statements which use the corresponding data unit. Then, "size" specifies the data size of the corresponding data unit, while "w" represents an importance assigned to the corresponding data unit. As may be appreciated from the above description, sL for each data unit may be determined by analyzing each dataset dL and each sNode of each SQL statement. Then, "w" may be calculated based on the included important values of these SQL statements which use a corresponding data unit.

In the final example of the data structure calculated by the data loading manager 102 of FIG. 1, the jNode data structure may be represented using Equation 3:

$$jNode=(id,dL,v) \qquad \text{Equation 3}$$

As described, each jNode corresponds to an independent node of the corresponding query graph, whose dataset contains no other dataset in the remaining independent nodes. As shown, each jNode includes "id" which identifies the corresponding data loading job and may be identical to the id of the corresponding sNode. Similarly, "dL" identifies the list of data units to be loaded, and is identical to dL of the corresponding sNode. Finally in equation 3, the parameter "v" represents a relative importance or value of the associated data loading job. As described in detail below, the value "v" may be calculated based on a combination of importance values of each data unit listed in the corresponding dataset or data list dL of data units included in Equation 3.

Thus, in the example of FIG. 4, a particular SQL string or statement may be analyzed to obtain a corresponding access dataset (402). In some cases, for example, the SQL strings to be analyzed may be obtained from an SQL execution history that existed before a shutdown or other disruption to the system 100. Then, the data unit searcher 122 of the query analyzer 118 may obtain the access dataset for the analyzed SQL string using Equation 4:

$$dL'_i=\{du|du \text{ is accessed by } sql_i\} \qquad \text{Equation 4}$$

In Equation 4, each SQL string is parsed by the data unit searcher 122 to determine the accessed dataset. As shown in Equation 4, du stands for the data unit accessed by $sql_i$. Meanwhile, the dataset accessed by $sql_i$ is denoted as $dL'_i$.

Then, SQL dependencies may be analyzed to extend the dataset of each SQL string (404). For example, the data unit extender 124 may extend the dataset of each SQL string by including accessed datasets of parent nodes of the SQL string in question, as shown in equation 5:

$$S_i=\{sql|sql_i \text{ depends on } sql\}$$

$$dL_i=dL'_i \cup \{du|du \in dL'_j \wedge sql_j \in S_i\} \qquad \text{Equation 5}$$

As may be observed from Equation 5, $S_i$ is the set of all SQL strings on which $sql_i$ depends. All the datasets accessed by the SQL strings within $S_i$ are added to $dL'_i$. Then, the final dataset accessed by $sql_i$ is denoted as $dL_i$.

Then, dataset relationships between independent SQL strings may be analyzed to determine candidate datasets (406), by the candidate selector 128 and according to Equation 6.

$$C_i=\{dL|dL \subset dL_i\}$$

$$\text{CandidateDS}=\{dL_i|S_i \text{ is empty} \wedge C_i \text{ is empty}\} \qquad \text{Equation 6}$$

As described, accessed datasets of different SQL strings may have some relationship, such as a containment or overlapping relationship. As referenced above, an SQL string whose dataset contains the dataset of another SQL string should not be executed before loading of the contained dataset, and, as also described, independent SQL strings should generally be selected for data loading with higher priority, as compared to SQL strings which depend on earlier executed SQL strings. Thus, Equation 6 indicates that a particular potential candidate dataset $C_i$, should not include a dataset of another SQL string, so that CandidateDS includes all such datasets.

If CandidateDS contains only one element, then operations 408, 410, 412 may be skipped, since it is not necessary to select from among a plurality of candidate datasets in that circumstance. Otherwise, the data unit of the candidate datasets may be evaluated (408), e.g., by the data unit evaluator 130. For example, the data unit evaluator 130 may execute equation 7:

$$sL_i = \{sql_j \mid du_i \in dL_j\};$$
$$w_i = \frac{1}{size_i} \sum_{j \in sL_i} \frac{imp_j}{t_{ej} + t_{ij}}$$ 
Equation 7

In Equation 7, as shown, all data units belonging to any dataset within CandidateDS is evaluated. As may be observed, the importance $w_i$ of a given data unit varies directly with an assigned calculated importance thereof, and inversely with respect to a size, estimated execution time, and estimated loading time.

Thus, as shown, $sL_i$ identifies the SQL string that accesses $du_i$. Meanwhile, $w_i$ is a weighted sum of importance values of each SQL string within $sL_i$. The weight of each SQL statement is decided by its execution and loading time, while the $size_i$ in Equation 7 represents the data size of the data unit $du_i$. As already described, $w_i$ indicates the relative importance of $du_i$.

Then, the various data loading jobs may be evaluated (410), e.g., by the job evaluator 132 of the sequencer 120 of FIG. 1. For example, the job evaluator 132 may implement Equation 8:

$$v_i = \sum_{j \in dL_i} w_j; dL_i \in CandidateDS$$ 
Equation 8

That is, after evaluation of every dataset within CandidateDS, each data loading job that is responsible for loading a dataset in CandidateDS should be evaluated. As referenced above, value $v_i$ is an indicator of relative importance of the data loading job in question. As shown in Equation 8, the value $v_i$ is represented as a sum of importance values of the various data units there accessed by $sql_i$.

Scheduling of the data loading job may then proceed (412), by virtue of execution of the job scheduler 134 of FIG. 1. For example, the job scheduler 134 may execute Equation 9:

selected_loading_jobid=argmax$\{v_i, dL_i \in CandidateDS\}$   Equation 9

As may be appreciated, each dataset within CandidateDS corresponds to a candidate data loading job. Then, the data loading scheduler 134, in the example, may simply choose the candidate data loading job having the maximum value of $v_i$.

Although not explicitly or separately illustrated in the example of FIG. 4, it may be appreciated from the above description that, if any jNode is remaining (414), and after execution of the chosen data loading job, the core data structures sNode, dNode, jNodes should be updated. For example, data units loaded and finished data loading jobs may be removed from the dNode data structure array, as well as from dL of the sNode and jNode data structures. After such updating, a second iteration of operations 404-412 may be completed, until no jNode is remaining (414), whereupon the process may end (416).

The following is a use case example for loading tables during a recovery phase of the in-memory database 106, using the example of FIG. 2A. In FIG. 2A, as described, each of the nodes 202-216 represents, e.g., an SQL string to be executed. For each such SQL string, a corresponding importance value and estimated execution time are also known, as shown in Table 1:

TABLE 1

| Node Number | dL' | Importance | Estimated Execution Time (s) |
| --- | --- | --- | --- |
| 1 | C1, C2 | 5.0 | 30 |
| 2 | C3, C4, C5 | 4.0 | 17 |
| 3 | C5 | 4.0 | 28 |
| 4 | C2, C6 | 4.0 | 25 |
| 5 | C4, C7 | 3.0 | 33 |
| 6 | C1, C2, C8 | 4.0 | 15 |
| 7 | C2, C3, C8 | 2.0 | 40 |
| 8 | C9, C10 | 2.0 | 22 |

Then, the sNode data structure may be constructed using equations 1 and 5, as shown in table 2:

TABLE 2

| id | dL | imp | $t_v$ (s) | $t_l$ (ms) |
| --- | --- | --- | --- | --- |
| S1 | C1, C2 | 5.0 | 30 | 50 |
| S2 | C3, C4, C5 | 4.0 | 17 | 45 |
| S3 | C1, C2, C5 | 4.0 | 28 | 65 |
| S4 | C1, C2, C3, C4, C5, C6 | 4.0 | 25 | 105 |
| S5 | C3, C4, C5, C7 | 3.0 | 33 | 65 |
| S6 | C1, C2, C3, C4, C5, C6, C8 | 4.0 | 15 | 120 |
| S7 | C1, C2, C3, C4, C5, C6, C7, C8 | 2.0 | 40 | 140 |
| S8 | C1, C2, C3, C4, C5, C6, C7, C8, C9, C10 | 2.0 | 22 | 150 |

Then, using Equation 6, candidate dataset may be determined, specifically, as described, an sNode may be selected that is independent and that does not contain a dataset of another independent sNode. Then, CandidateDS may be represented as shown in equation 10:

$$C_i = \{dL \mid dL \subset dL_i\}$$

CanditiateDS=$\{dL_i \mid S_i$ is empty $\wedge C_i$ is empty$\}$   Equation 10

As shown, $dL_1$ includes C1, C2, because those are the data units included within the dataset of the node S1, e.g., the node 202 of FIG. 2A. Meanwhile, $dL_2$ includes data units C3, C4, C5, because the node 204 is independent of the node 202, and neither dataset includes the other. Consequently, candidate ds may be represented as [$dL_1$, $dL_2$], as shown in Equation 10.

Then, Equations 2 and 7 may be used to evaluate each data unit and construct the resulting dNode, as shown in table 3:

TABLE 3

| id | sL | Size (KB) | w |
| --- | --- | --- | --- |
| C1 | S1, S3, S4, S6, S7, S8 | 160 | 0.0055 |
| C2 | S1, S3, S4, S6, S7, S8 | 144 | 0.0061 |
| C3 | S2, S4, S5, S6, S7, S8 | 80 | 0.0111 |
| C4 | S2, S4, S5, S6, S7, S8 | 95 | 0.0094 |
| C5 | S2, S3, S4, S5, S6, S7, S8 | 87 | 0.0110 |

Then, the jNode data structure may be constructed using Equations 3 and 8, as shown in table 4:

TABLE 4

| id | dL | v |
|----|----|----|
| J1 | C1, C2 | 0.0116 |
| J2 | C3, C4, C5 | 0.0315 |

Finally, Equation 9 may be used to complete the data loading job scheduling. Specifically, as may be observed from Table 4, J2 has a higher value of v than J1, and is thus chosen to be loaded first. As described above, after the execution of the data loading job for J2, the core data structures are updated, and data loading jobs are iteratively identified and selected, until no data loading job remains. In the just-described example use case, a final data loading sequence for datasets of the various SQL strings in FIG. 2A may be determined to be S2, S1, S3, S4, S6, S5, S7, and S8.

The following pseudo code examples provide additional example representations of the concepts and features described above. Consequently, the following pseudo code is to be understood based on above terminology, notation, and explanation.

---
Pseudo Code 1.1: Constructing sNode
---
```
Variable Definitions:
% ArraySQL: Array of SQL statements to be analyzed
% ArrayDependency: Array of SQL dependencies
% ArraySNode: Array of sNode
FUNCTION CONSTRUCT_SNODE
BEGIN
    ArraySNode = INITIALIZE(ArraySQL)
    ArraySNode = EXTEND_DATA_LIST( ArraySNode, ArrayDependency )
    Return ArraySNode
END
```

---
Pseudo Code 1.2: Select Candidate
---
```
Variable definition:
% ArraySNode: Array of sNode constructed by CONSTRUCT_SNODE
% ArrayDependency: Array of SQL dependencies
% ArrayIndepend: Array of independent loading job index
% ArrayCandidate: Array of candidate loading job index
% CONTAIN_OTHER_DATA_LIST: This function is used to check if data list of current node
contains some data list of other nodes.
FUNCTION SELECT_CANDIDATE
BEGIN
    ArrayIndepend = GET_INDEPENDENT_NODE(ArraySNode, ArrayDependency );
    FOR EACH node IN ArraySNode
    {
      IF (CONTAIN_OTHER_DATA_LIST ( node.data_list ) = FALSE ) {
        ArrayCandidate.APPEND( node )
      }
    }
RETURN ArrayCandidate
END
```

---
Pseudo Code 1.3: Constructing dNode
---
```
Variable definition:
% ArraySNode: Array of sNode
% ArrayDNode: Array of dNode
FUNCTION CONSTRUCT_DNODE
BEGIN
    ArrayDNode = EXTRACT_DATA_UNIT_SET ( ArraySNode )
    ArrayDNode = SET_SQL_LIST_FOR_DNODE ( ArrayDNode, ArraySNode )
    ArrayDNode = CALCULATE_DATA_UNIT_VALUE (ArrayDNode, ArraySNode )
    Return ArrayDNode
END
```

---
Pseudo Code 1.4: Constructing jNode
---
```
Variable definition:
% NumOfCandidate: Number of candidate SNode
% ArraySNode: Array of sNode
% ArrayDNode: Array of dNode
% ArrayJNode: Array of jNode
FUNCTION CONSTRUCT_JNODE
BEGIN
    ArrayJNode = INITIALIZE( ArraySNode, NumOfCandidate )
    ArrayJNode = CALCULATE_JOB_VALUE (ArrayJNode, ArrayDNode)
    Return ArrayJNode
END
```

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output.

Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    at least one processor; and
    instructions recorded on a non-transitory computer-readable medium, and executable by the at least one processor, the system including
    a query analyzer configured to cause the at least one processor to identify a plurality of queries and associated query characteristics, the query characteristics including a corresponding dataset of data units for each query, wherein the data units are to be loaded from an offline memory into a memory of an in-memory database during a loading process that is subsequent to a system disruption in which the data units were erased from the memory of the in-memory database, and further wherein the data units were stored within the memory of the in-memory database in accordance with a default loading order corresponding to a default loading sequence that was used prior to the system disruption; and
    a sequencer configured to cause the at least one processor to define an optimized loading order in which the data units are loaded during the loading process to satisfy the plurality of queries awaiting execution from prior to the system disruption, to be used in place of the default loading order as part of a recovery from the system disruption, including changing the default loading sequence to prioritize selected datasets, including iteratively selecting a current, selected dataset for loading into the memory of the in-memory database, based on dependencies between the plurality of queries as included within the query characteristics, and on relationships, if any, between the datasets, and on a previously-selected dataset selected during a preceding iteration.

2. The system of claim 1, wherein the query characteristics include a directed, acyclic dependency graph representing the dependencies between the plurality of queries.

3. The system of claim 1, wherein the query analyzer includes:
    a data unit searcher configured to derive the data units for each dataset for each query, based on an analysis of the query; and
    a data unit extender configured to derive, for each query, parent queries from which the query depends, if any, and further configured to derive data units accessed by the parent queries for inclusion within the query characteristics.

4. The system of claim 1, wherein the query analyzer includes a time estimator configured to estimate an execution time for each query, and further configured to estimate a loading time for each data unit.

5. The system of claim 1, wherein the query characteristics include an importance value for each query.

6. The system of claim 1, wherein the sequencer includes a candidate selector configured to select at least two candidate datasets, for selection therefrom of the selected dataset, wherein each corresponding query for the at least two datasets is an independent query that does not depend from another query, and has no common data units with any other independent query.

7. The system of claim 6, wherein the sequencer includes a data unit evaluator configured to evaluate each data unit within each of the at least two candidate datasets.

8. The system of claim 7, wherein the data unit evaluator is configured to evaluate each data unit based on queries corresponding thereto, a size thereof, a loading and execution time thereof, and an importance value for each data unit.

9. The system of claim 7, wherein the sequencer includes a job evaluator configured to evaluate each candidate dataset and select the selected dataset therefrom, based on an importance value for the corresponding loading job, wherein the importance value for the corresponding loading job is based on corresponding importance values of included data units.

10. The system of claim 1, wherein the sequencer is configured to:
   select at least one new candidate dataset, based on updated query characteristics of a remaining plurality of queries;
   select a new selected dataset from the at least one candidate dataset for loading into the memory of the in-memory database; and
   continue selecting at least one candidate dataset, and at least one selected dataset therefrom, until all data units have been loaded into the memory of the in-memory database.

11. A computer-implemented method for executing instructions stored on a non-transitory computer readable storage medium, the method comprising:
   identifying a plurality of queries and associated query characteristics, the query characteristics including a corresponding dataset of data units for each query, wherein the data units are to be loaded from an offline memory into a memory of an in-memory database during a loading process that is subsequent to a system disruption in which the data units were erased from the memory of the in-memory database, and further wherein the data units were stored within the memory of the in-memory database in accordance with a default loading order corresponding to a default loading sequence that was used prior to the system disruption;
   re-ordering the data units from the default loading sequence to define an optimized loading order in which the data units are loaded during the loading process to satisfy the plurality of queries awaiting execution from prior to the system disruption, to be used in place of the default loading order as part of a recovery from the system disruption, including changing the default loading sequence to prioritize selected datasets by
      identifying at least two candidate datasets, each candidate dataset and associated query not depending on any query, and not having any overlapping data units with any other candidate dataset;
      selecting a selected dataset from the at least two candidate datasets, based on an importance value of each data unit within each candidate dataset;
      loading the selected dataset into the memory of the in-memory database; and
      iteratively repeating the identifying of at least two candidate datasets, based on updated query characteristics, the selecting of a new selected dataset, and the loading of the new selected dataset, until all of the data units of the datasets have been loaded into the memory of the in-memory database.

12. The method of claim 11, wherein the query characteristics include a directed, acyclic dependency graph representing the dependencies between the plurality of queries.

13. The method of claim 11, wherein the identifying the plurality of queries and query characteristics includes:
   deriving the data units for each dataset for each query, based on an analysis of the query;
   deriving, for each query, parent queries from which the query depends, if any; and
   deriving data units accessed by the parent queries for inclusion within the query characteristics.

14. The method of claim 11, wherein selecting the selected dataset includes:
   evaluating each candidate dataset and selecting the selected dataset therefrom, based on an importance value for the corresponding loading job, wherein the importance value for the corresponding loading job is based on corresponding importance values of included data units.

15. A computer program product, the computer program product being tangibly embodied on a non-transitory computer-readable storage medium and comprising instructions that, when executed, are configured to cause at least one processor to:
   identify a dependency graph including nodes representing a corresponding plurality of queries and associated query characteristics, the query characteristics including a corresponding dataset of data units for each query, wherein the data units are to be loaded from an offline memory into a memory of an in-memory database during a loading process that is subsequent to a system disruption in which the data units were erased from the memory of the in-memory database, and further wherein the data units were stored within the memory of the in-memory database in accordance with a default loading order corresponding to a default loading sequence that was used prior to the system disruption; and
   re-order the data units from the default loading sequence to define an optimized loading order in which the data units are loaded during the loading process to satisfy the plurality of queries awaiting execution from prior to the system disruption, to be used in place of the default loading order as part of a recovery from the system disruption, including changing the default loading sequence to prioritize selected datasets by
      selecting a selected dataset, based on dependencies between the plurality of queries as included within the dependency graph, and on relationships, if any, between the datasets;
      loading the selected dataset into the memory of the in-memory database; and
      selecting a new selected dataset, based on the dependency graph and on updated query characteristics following the selection of the selected dataset.

16. The computer program product of claim 15, wherein the query characteristics for each query include all corresponding data units, as well as extended data units included within a parent query represented by a parent node of a corresponding query node within the dependency graph.

17. The computer program product of claim 15, wherein the query characteristics include an importance value for each query.

18. The computer program product of claim 15, wherein the instructions, when executed, are further configured to cause the at least one processor to:
   select at least two candidate datasets, for selection therefrom of the selected dataset, wherein each corresponding query for the at least two datasets corresponds to an independent node that does not depend from another node within the dependency graph, and has no common data units with any other query of any other independent node within the dependency graph.

19. The computer program product of claim 18, wherein the instructions, when executed, are further configured to cause the at least one processor to:
   evaluate each data unit within each of the at least two candidate datasets, based on queries corresponding thereto, a size thereof, a loading and execution time thereof, and an importance value for each data unit.

20. The computer program product of claim 19, wherein the instructions, when executed, are further configured to cause the at least one processor to:

evaluate each candidate dataset and select the selected dataset therefrom, based on an importance value for the corresponding loading job, wherein the importance value for the corresponding loading job is based on corresponding importance values of included data units.

* * * * *